US011930300B1

(12) United States Patent
Resendiz Castillo et al.

(10) Patent No.: US 11,930,300 B1
(45) Date of Patent: Mar. 12, 2024

(54) USING LOCAL VIDEO STREAM AS AN OVERLAY FOR VIDEO CAMERA REDIRECTION IN REMOTE DESKTOP

(71) Applicant: Amazon Technologies, Inc., Seattle, WA (US)

(72) Inventors: Jose Miguel Resendiz Castillo, Seattle, WA (US); Harsh Murarka, Kirkland, WA (US); Paolo Maggi, Alba (IT)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 17/834,748

(22) Filed: Jun. 7, 2022

(51) Int. Cl.
*H04N 7/15* (2006.01)
*G06F 9/455* (2018.01)
*H04L 12/18* (2006.01)
*H04N 7/14* (2006.01)

(52) U.S. Cl.
CPC ......... *H04N 7/157* (2013.01); *G06F 9/45533* (2013.01); *H04L 12/1831* (2013.01); *H04N 7/147* (2013.01); *H04N 7/152* (2013.01)

(58) Field of Classification Search
CPC ........ H04N 7/157; H04N 7/147; H04N 7/152; H04L 12/1831
See application file for complete search history.

(56) References Cited

U.S. PATENT DOCUMENTS 9,721,028 B2 *  8/2017  Lee ..................... G06F 16/954
2018/0295400 A1 * 10/2018  Thomas ......... H04N 21/234327

* cited by examiner

*Primary Examiner* — Amal S Zenati
(74) *Attorney, Agent, or Firm* — Davis Wright Tremaine LLP

(57) ABSTRACT

Systems and methods are described for replacing image data from a virtual machine with local image data, such as for a video application. In some aspects, a method for replacing image data in a video application may include obtaining first image data from a camera connected to the user device and transmitting the first image data to a virtual machine that executes the video application. The user device may receive a video application image from the virtual machine that includes an indication that identifies the first image data. The user device may identify the first image data in the video application image based on the indication and replace it with second image data obtained from the camera device to produce a modified video application image. The client device may render the modified video application image in a virtual computing environment displayed on the user device.

20 Claims, 8 Drawing Sheets

USING LOCAL VIDEO STREAM AS AN OVERLAY FOR VIDEO CAMERA REDIRECTION IN REMOTE DESKTOP

BACKGROUND

Given increases in communication bandwidth, technological advances, and the need for secure computing environments, systems that provide for remote desktops have seen increased development. These remote desktops provide, in essence, a virtual machine that provides an operating system and any of a number of different applications that can be interacted with on a local client machine, such as a laptop or desktop computing device. In this virtual desktop infrastructure (VDI) domain, there are a myriad of protocols and techniques for streaming a remote operating system's desktop environment into a local client device. One of the key features of such desktop streaming protocol is the ability to redirect the user's local resources or devices such as hard drives, printers, microphone or video cameras so that they are available to be used within the remote desktop. In the particular user-case of video camera redirection, the user can use applications that require the use of a camera from within the remote operating system's desktop. One of the usual features of such applications is to show the user a preview of the user's video camera. Since this camera is capturing the video feed from the user's client device and being processed/rendered in an application running in the remote operating system there can be a significant visual delay that the user experiences due to the round trip of the video camera video stream images. As such, there is a need to reduce lag in generating such a preview of the user by a local camera in a remote desktop environment.

BRIEF DESCRIPTION OF THE DRAWINGS

Various techniques will be described with reference to the drawings, in which.

DETAILED DESCRIPTION

Figure 1:
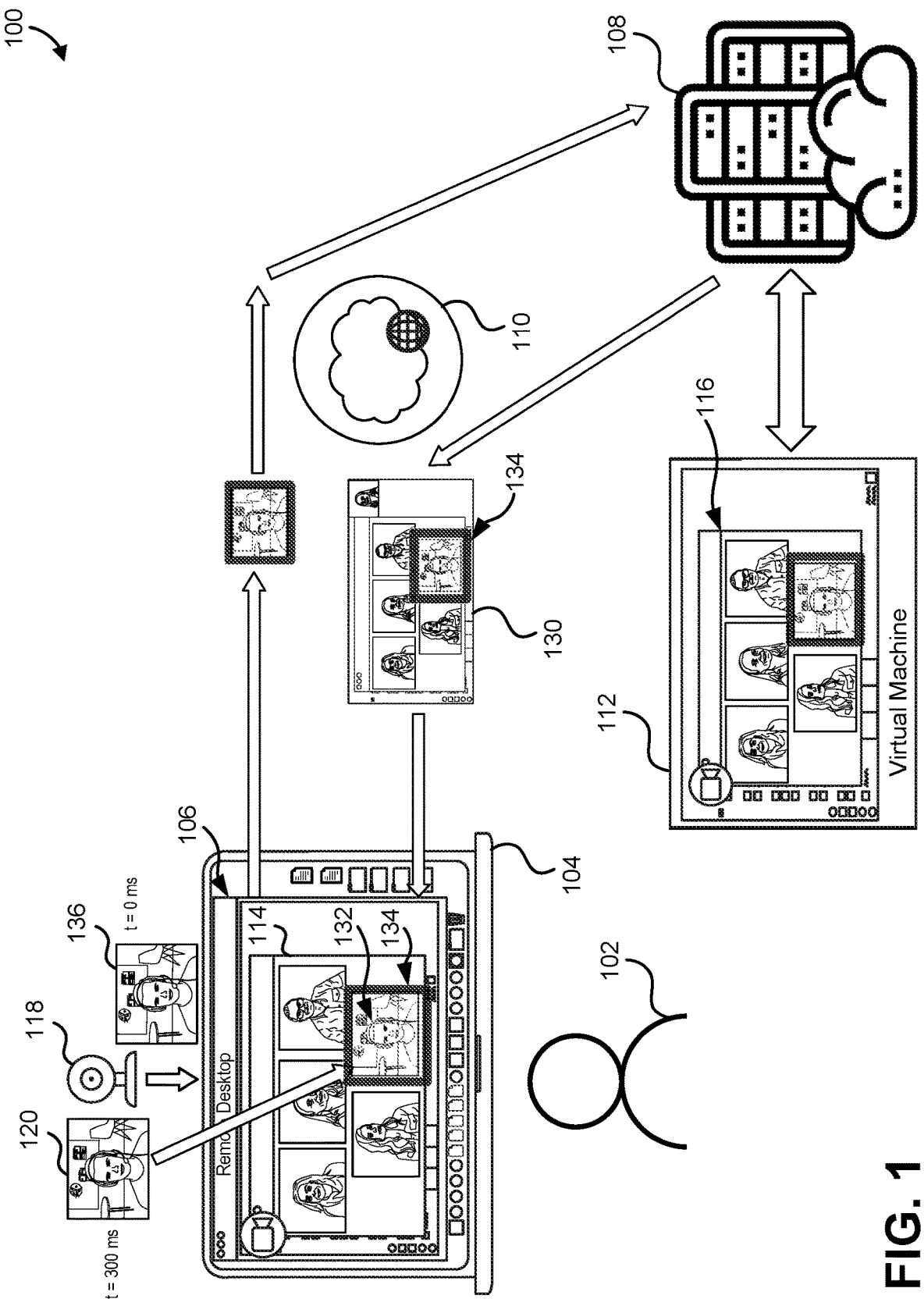
FIG. 1 illustrates an example of replacement of video captured by a user device in a remote or virtual desktop environment, according to at least one embodiment.

Systems and methods are described herein for replacing a video stream provided by a remote desktop on a user or client device with a local video stream. In some aspects, a local video camera may be part of or connected to a user computing device, such as a desktop or laptop computing device. This local video camera, or other video capture device, may capture and provide video/image data, such as of a user of the computing device, to provide a preview in a video conferencing application of the user to the user. In some cases, the user computing device may connect to a remote desktop service, which may provide a virtual machine that in turn provides a remote desktop or virtual computing environment (e.g., operating system and applications) to the user device. In one example, the remote desktop may interface with the local video camera to provide video of the user in a video conferencing application. According to existing protocols, the video captured of the user by the local video camera is transmitted to the remote desktop service, which places the captured video in a video conferencing application (e.g., for other users/user devices to view), and sends this generated image/video of all users on the video conferencing call back to the user device to be displayed in the remote desktop. Because this video of the user has to make in essence two trips, one to the virtual machine/remote desktop service, and then back to the user device, significant delays can be introduced in the video, such as when compared to a video from another user device, which will have approximately have of the delay from the perspective of the first user device.

According to the described techniques, because the video camera video stream is already present in the user's client device, a significant improvement in user's experience can be achieved on the remote desktop image area where the preview is being shown by overlaying the local video stream in the region of the screen where the remote preview of the user's camera is being shown. In some examples, by marking or otherwise identifying a certain region of the captured video stream and replacing that region with some type of indicator or marker (e.g., a border of a particular color of choosing) before sending it to the remote operating system, then the same marked pixels will eventually come back to indicate the region of the screen where the video camera preview is being displayed. In some cases, using the marked pixels as an identifier, the client device can determine a location on the screen and dimensions in pixels where the local video stream can be placed or overlayed on top of the image coming from the remote desktop to provide the local image data that reacts with less delay to movements of the user. This may provide for a much better user experience in interactions with video conferencing applications, and even to any application that utilizes video. The described techniques may improve the quality of video displayed in the remote desktop on the user device both by decreasing delay in the video and by increasing the quality of the video by reducing or eliminating image compression processes used to transfer the image data over one or more networks/network devices.

As described above, the client device may mark the local captured video soon after it is initially captured to be able to identify it when it comes back from the remote desktop service. Upon identifying the region, the user device may then replace this region with video data captured from the local video camera (e.g., with no or minimal delay). In other examples, the user device may send the captured video data (without modification) to the remote desktop service, which may then mark the pixels in some way, such that the user device can identify the correct pixels (e.g., region of the image/video) and replace them with the local video stream. In this way, more of the processing required to implement the video replacement can be pushed to the remote desktop service, which may have more resources/more reliable resources, such that the described techniques can be used by a wider variety of user devices (e.g., such that the minimum resources of the user device to be able to implemented the described techniques are drastically lowered).

In some cases, marking or otherwise identifying the pixels of the local captured video, which will be replaced at a later time, may include changing one or more of the attributes of the individual pixels. This may include selecting a color for a border around the region of interest that is not used or commonly used in the video conferencing application, and replacing pixels forming a border around the perimeter of the video stream, such that these pixels are readily identifiable or distinguishable. In other cases, other attributes of pixels may be altered, such as the alpha value or channel (e.g., indicating transparency, which may not typically be utilized in applications where the described techniques can be used). In other cases, the indication of the portion of video to be replaced can be included in messaging that is external to the image data being sent. For example, an indication of the pixel area, such as by four points that if connected form a square or rectangle around the region of interests, could be used to a similar effect.

In some cases, the described techniques may account for moving of the application window on the client device, by pausing or otherwise suspending replacement of the indicated video with the local video, to reduce computing resource usage when no visual affect will be displayed to a user. Similarly, if the video segment to be replaced is blocked by another window on the user interface of the user device, then replacement operations may similarly be suspended until the portion to be replaced becomes visible on the screen again.

As one skilled in the art will appreciate in light of this disclosure, certain embodiments may be capable of achieving certain advantages, including some or all of the following: (1) decreased delay in rendering video in a remote desktop on a user device; (2) more efficient utilization of computing resources to generate a preview of video data; (3) increased image quality in rendering video in a remote desktop on a user device; and (4) other advantages as will be made apparent in the rest of this disclosure.

FIG. 1 illustrates an example diagram 100 of replacement of video captured by a user device in a remote or virtual desktop environment. As illustrated, a user 102 may operate a computing device 104, which may be any type of computing device, such as a laptop, desktop, or mobile computing device (e.g., a smart phone). The user may interact with an operating system and various application through a remote desktop or virtual computing environment 106, which may be provided through a remote desktop or virtual computing environment service 108 over one or more networks 110. As illustrated, the virtual computing environment service 108 may instantiate one or more virtual machines 112, which may provide an operating system and one or more applications to various user devices, such as user device 104.

In some cases, the virtual machine 112 may provide a video conferencing application, such as represented by windows 114 and 116, displayed on user or client device 1004 and virtual machine 112, respectively. In this example, user device 104 may be equipped with or connected to (e.g., wirelessly, via a USB cable, etc.,) to a camera device 118. Camera device 118 may include any type of image capturing device, such as may capture images at various frame rates. Camera 118 may capture image data 120 of user 102 for presentation in the video conferencing application 114, 116. This captured image data 120 may be transmitted over one or more networks 110 to the remote desktop service 108/the specific virtual machine 112 assigned to user device 104. The virtual machine 112 many collect this image data and image data from other user devices 122, 124, 126, 128, and generate a video conferencing application image 130 (e.g., a display window that contains the image data from each of user device 122-128, and image data 120 of user 102), to present to user device 102, 122, 124, 126, 128. The virtual machine 112 may 112 may submit the image 130 back to user device 104 (and similarly to user devices 122-128) to be displayed on user device 120 and 122-128 through a virtual computing environment, such as virtual computing environment 106 illustrated for user device 102.

As illustrated, the video conferencing application 114 may provide a preview or display of the image data or video 120 captured of user 102 back to the user 102 via a window 132 within the video conferencing application image 130. In the example virtual computing environment, the image data 120 that is displayed in window 132 back to the user 102 via user device 104 may delayed from the current time due to the fact that the image data 120 has had to travel to the remote desktop service 108/virtual machine 112, and back again to the user device 104 before being displayed. This delay or lag time may be undesirable for a number of reasons, such as including the user not being able to determine what he or she looks like in real time to other users on the video conferencing call, the delay may indicate there is a bad network connection, and so on.

In order to address this problem, the described systems and technique may mark or otherwise indicate an area or portion that the user image data preview 132 will occupy in relation to the video conferencing application image 130. In some cases, the indication (e.g., what pixels of the user image data 120 should be marked and how they should be marked) may be determined by the user device 104, or in other cases, it may be determined by the remote desktop service 108/virtual machine 112. This marking or indication may be represented by bold outline 134 illustrated in FIG. 1. Upon receiving the video conferencing application image 130 from virtual machine 112, the user device 104 may identify the marked portion of image 130, and replace or substitute the pixels indicated in that portion with image data 136 captured more recently by camera device 118. Because the image data 136 is obtained by a local camera device 118, there is minimal delay between obtaining the image data 136 and displaying it in video conferencing image 130. Various details of the process for identifying and replacing the image data 120 will be described in greater detail below.

In some aspects, each time image data is transferred over one or more networks, the corresponding network devices may apply various compression algorithms and techniques to the image data to reduce the size of the image data for transport. As illustrated, user device 104, service 108, VM 112, and/or other devices generally associated with network 110 may implement these various image compression techniques. When image compression is applied to image data, it may reduce the quality and/or resolution of the image data. Using the described techniques, some or all of these image compression processes may be eliminated, thus increasing the quality and/or resolution of the image data obtained locally by camera 118 displayed on the user device 104, such as in window 132.

Figure 2:
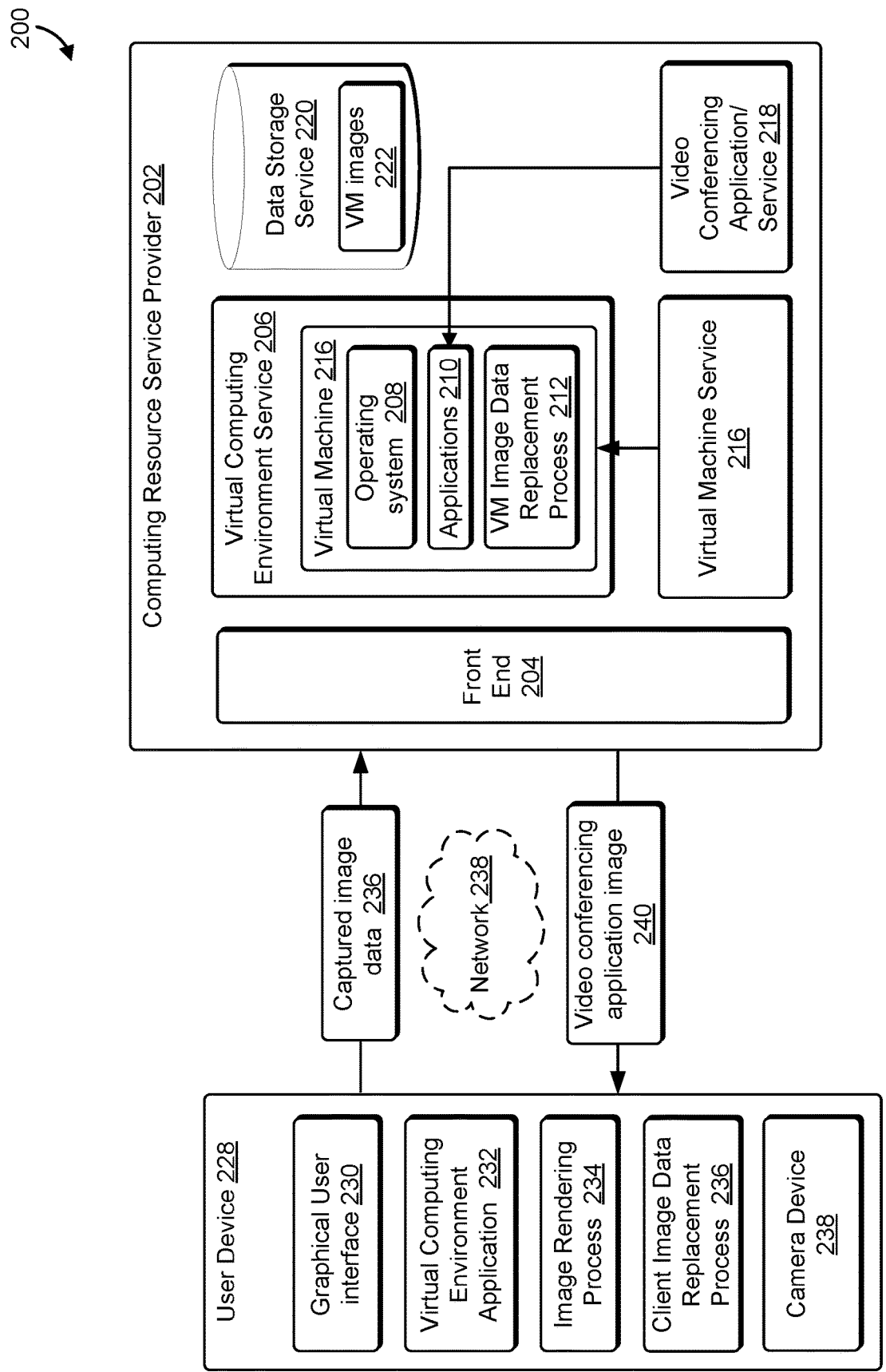
FIG. 2 illustrates an example environment in which the described techniques can be practiced, according to at least one embodiment.

FIG. 2 illustrates an example environment 100 in which the described image data replacement processes, such as client image data replacement process 236 and VM image data replacement process 212, may be carried out by a user device 228 and a virtual machine 216 provided by a computing resource service provide 202. Various user or client computing devices 228 may interact with the computing resource service provider 202 through one or more networks 238 to access this functionality.

Client 228 may refer to a client computer system or computing device, such as a laptop, desktop, mobile device, tablet, etc., connected to a server (e.g., computing resource service provider) over a network 238. In some cases, client 228 refers to a user or operator of a client computer system and may be an employee of an organization that utilizes a computing resource service provider 202 to interact with various forms of data, such as through one or more of a virtual computing environment service 206, a virtual machine service 216, a video conferencing application or service 218, and/or data storage service 220. In some cases, computing device 228 may be associated with the computing resource service provider 202, such as may be provided by or through a virtual computing environment service 206.

In some aspects, user/client device 228 may include or provide a graphical user interface 230, a virtual computing environment application 232, an image rendering process 234, and a client image data replacement process 236. The graphical user interface 230 may display various interfaces, windows, selection items, etc., for interfacing with a number of different applications, processes etc., both native to a computing environment provided by user device 228 (e.g., via a typical computing desktop or mobile device home screen) and by a virtual computing environment service 206, such as through a virtual computing environment application 232.

The virtual computing environment application 232 may interface with a virtual machine 216 provided by virtual computing environment service 206 to provide access to a virtual computing environment or remote desktop (e.g., remote desktop 106), such as may include one or more windows with access to an operating system 206 and application 210, which may include a video conferencing application, such as described above in reference to FIG. 1. In some cases, virtual computing environment application 232 may provide for an interface whereby streaming content from VM 216 may be displayed on user device 228, such as through GUI 230. The virtual computing environment application 232 may also enable interactions by physical input devices (e.g., mouse, keyboard, microphone, camera, etc.) or or locally connected with user device 228 with various application 210 provided in the virtual computing environment by V 216. In this way, the virtual computing environment application 232 may provide for an interactive experience with an operating system 208, and applications 210 running on a VM 216 as though the operating system 208 and applications 210 were running on the user device 228 locally.

The image rendering process 234 of the user device 228 may obtain image data and other data from the VM 216/virtual computing environment service 206, format the image data, and render it such that it that can be displayed by the GUI 230 of user device 228, via various techniques as are known in the art. In some aspects, the user device 228/image rendering process 234 may also include or execute a client image data replacement process 236, which may execute various techniques, as described herein, to replace image data received from a video conferencing application or service 218 which is executed by a VM 216, with more recent image data that is captured by a camera device 238 that is in communication with the user device 228, which will be described in greater detail below. The camera device 238 may include any type of device that is capable of capturing image data or video data, such as a web camera, a camera built into a computing device, a camera on a smartphone, or a camera that can be connected to any of various computing devices, wirelessly or via a cable, such as a USB cable.

In some cases, user client or user device 228 may interact with various services of the computing resource service provider 202 via front end 204, which may may receive various requests and information from user device 228 and direct it to the appropriate service. The front end 204 may be a system including a set of web servers (e.g., a single web server or a set of web servers which may be managed by a load balancer) provided by the computing resource service provider 202. Web servers of the front end 204 may be configured to receive various requests and data and to process them according to one or more policies associated with the service. In some examples, client 228 uses client software that is configured to establish a client-server relationship with a service of a computing resource service provider 202.

A client 228 may connect to a service via front end 204, which receives requests from clients and routes them to backend services. Front end 204 may interface with one or more of a virtual computing environment service 206, a virtual machine service 216, a video conferencing application or service 218, and/or data storage service 220, and/or other services offered by a computing resource service provider 202 to its customers. In at least one embodiment, client 228 interacts with a GUI 230 to interact with various data provided by or through the computing resource service provider 202, such as a virtual computing environment, which can include various applications 210, and client-side software translates the GUI setup to a web service API request which is transmitted from the client computer system 228 to front end 204 via a network 238. In an embodiment, the network 238 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 238 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. The computing resource service provider 202 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. A computing resource service provider 202 described herein may be implemented using techniques described below in reference to FIG. 8. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems. The workflows described herein or any component(s) thereof can be executed in a container, a microVM, a node, or any other forms of compute capacity described herein. In some embodiments, such units of compute capacity may be arranged in the form of a computing "cluster," which can include at least one cluster primary (which runs control processes including scheduling, resource control, handling API requests, and deciding what runs on the cluster's nodes) and multiple units of compute capacity such as nodes (which are the worker machines that run tasks and/or containerized applications and other workloads). These clusters can run across a number of physical machines in a distributed computing environment such as a cloud provider network.

In some examples, the computing resource service provider 202 may provide data storage through a data storage service 220 to store and manage large volumes of data, including text, image, and other data. The data storage service 220 may store various data, such as may be organized into various accounts or profiles. In some aspects, the data storage service 220 may store various data used and/or modified by the virtual computing environment service 206, the virtual machine service 216, and/or the video conferencing application or service 218. In some aspects, the data storage service 220 may store one or more VM images 222, as may be used by the virtual machine service 216 to instantiate one or more virtual machines 216, such as to provide virtual computing environments through the virtual computing environment 206. The VM images 222 may store various information and configuration parameters of VMs, including operating system 208 information or program code, applications, such as to provide application 210, and various other data and information that is typically provided to instantiate a VM.

Data storage service 220 may be an on-demand data storage service, such as an object-based data storage service that services API requests to store and retrieve data objects synchronously, and may be configured to store various forms of data and media, and other data structures generated and updated by the contact service 110 and the scheduling service 116. The data storage service 220 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 220, may be organized into data objects, in one or more logical data containers. The data storage service 220 may include one or more data objects, which may have arbitrary sizes and may, in some instances, have constraints on size. Thus, the data storage service 220 may store numerous data objects of varying sizes. The data storage service 220 may operate as a key value store that associates data objects with identifiers of the data objects which may be used by the scheduling service 116 and/or the contact service 110 to retrieve or perform other operations in connection with the data objects stored by the data storage service 220. Access to the object-based data storage service 220 may be through application programming interface (API) calls to the service or via an interface, such as a graphical user interface (GUI). Access to the data storage service 220 may be through application programming interface (API) calls to the service, for example from client device 228 directly or through the computing resource service provider 202 and/or front end 204.

It should be appreciated that the data storage service 220 may additionally or alternatively provide non-object-based data storage, such as block data storage, table-oriented data storage, relational databases, file-based storage, and the like. The data storage service 220 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 202 may also provide a virtual computing environment service 206. The virtual computing environment service 206 may be a collection of computing resources, including physical resources, virtual resources, or combinations thereof, configured to instantiate VMs 216 to provide virtual computing environments to various user or client devices 228. The virtual computing environment service 206 may manage account access via various IAM polices. The virtual computing environment service 206 may also configure various VMs 216, which can operate to provide a virtual computing environment to various user devices 228. The virtual computing environment service 206 may manage or instruct a virtual machine service 216 to instantiate VMs with certain specifications, such as what operating system they should employ, and what applications 210 should be installed on individual VMs. In some cases, the virtual computing environment service 206 and/or the VM service 216 may access a VM image 222 from the data storage service to instantiate a VM having various processing, storage, and network resources, as well as various specifications, applications, etc. As this type of service is well known, those of skill in the art will appreciate that virtual computing environment service 206 and VM service 216 may provide various functionality, some of which is not explicitly described here.

The computing resource service provider 202 may also provide a virtual machine service 216. The virtual machine service 216 may be a collection of computing resources, including physical resources, virtual resources, or combinations thereof, configured to instantiate VMs 216, such as to be used by virtual computing environment service 206 to provide virtual computing environments to various user devise 228. Similarly, the computing resource service provider 202 may also provide a video conferencing application or service 218. The video conferencing application or service 218 may be a collection of computing resources, including physical resources, virtual resources, or combinations thereof, configured to provide a video conferencing functionality, including real time or near real time communications in the form of textual, voice, and video or images, to a variety of user devices 228. In some cases, when the video conferencing is provided by an application 218, the application may be executed on a given VM 216 to provide the application through the virtual computing environment application 232 to a user device 228. In other cases, where the video conferencing is provided by an service 218, the service 218 may be interact with or through a given VM 216 to provide the functionality through the virtual computing environment application 232 to a user device 228. In either case, a user device 228 may, through the video conferencing application or service 218, interact with various other user devices via text, audio, and/or video communications.

In some examples, a camera device 238 may capture image data of a user of user device 228. The user device 228, upon engaging with a virtual computing environment service 206, may send the captured image or video data 236 to the virtual computing environment service 206 (or in some case, the communication may be routed directly to a VM 216 that is providing the virtual computing environment for the specific client device 228), to interface with a video conferencing application/service 218 to engage with other users of other user device. Upon receiving the image data, the VM 216 may generate an image of the video conferencing application. As used herein, a video conferencing application may include data in a format that can be displayed on various user devices that includes image data from various user devices to generate an interactive display including image data of the various users to engage in a virtual meeting or conference, which may include video, audio, and/or text communications, such as via a messaging window or component. In other cases, where the application is not specifically a video conferencing application, but one that includes video input from multiple user devices that are displayed together, an application image generally refers to a similar set of data.

The VM 216 may then communicate the video conferencing application image back to the user device at 240 to be rendered and displayed via GUI 230 of the user device via processes 234. Using the techniques described herein, either the client image data replacement process 236, or the VM image data replacement process 212 may mark otherwise indicate in the image data or pixels corresponds to the image data of the user captured by camera device 238. That marking or indication may then be included or sent with the video conferencing application image 240 back to the user device. Upon receiving the image, the client image data replacement process 236 may identify the marked pixels or portion of the image that includes the image data of the user, and replace that image data with image data captured more recently from the camera device 238, to provide image data that include less delay from the time at which the video conferencing application image is displayed to the user device 228.

Figure 3A:
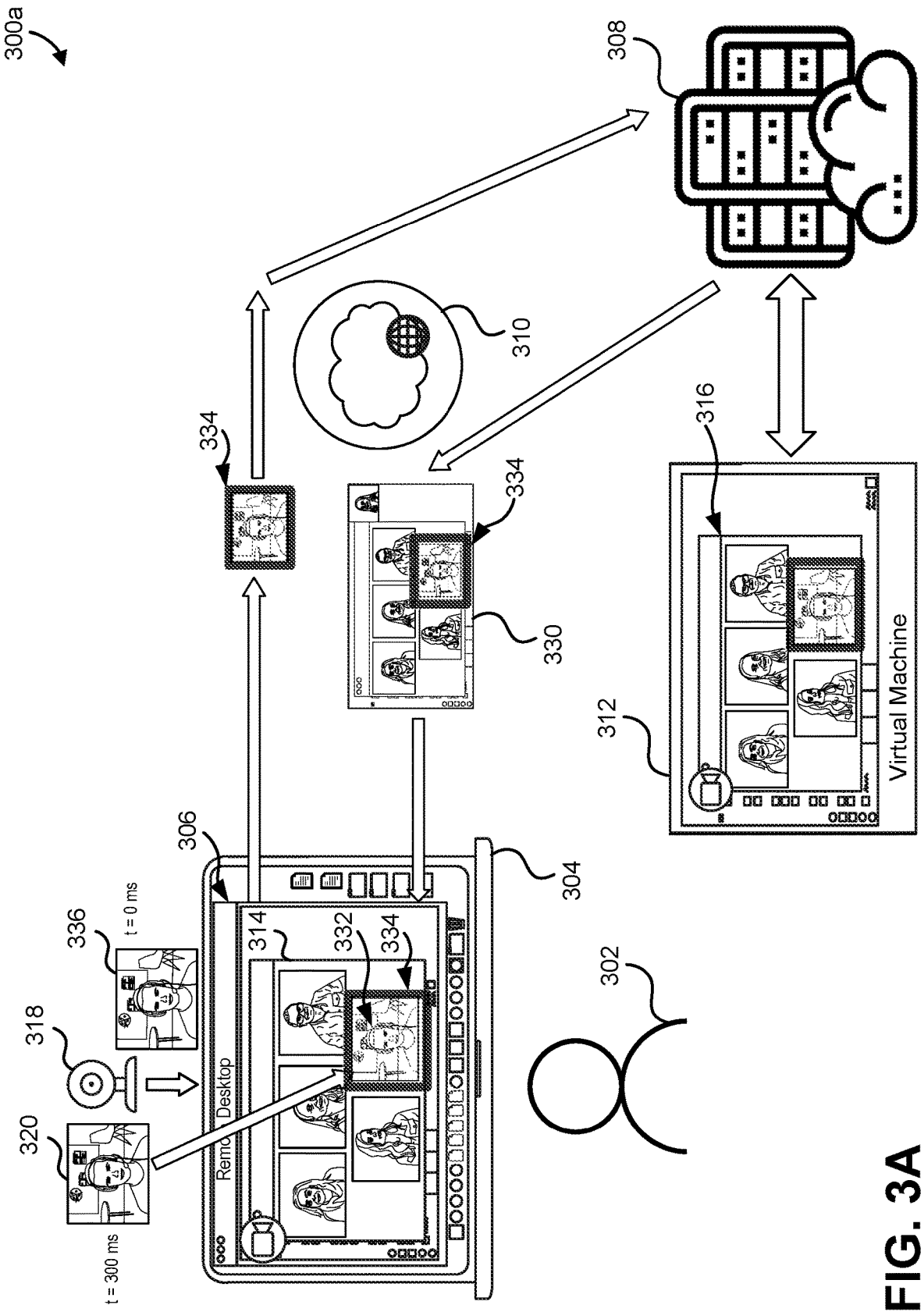
FIGS. 3A and 3B illustrate example diagrams of local video replacement operations through a remote desktop, according to at least one embodiment.

FIG. 3A illustrates an example diagram 300a of a local video replacement operation through a remote desktop. Diagram 300a includes many of the same elements or aspects as diagram 100 described above in reference to FIG. 1; for the sake of brevity, similar aspects will not be described again here.

As illustrated, a user 202 may operate a computing device 204 and interact with an operating system and various application through a remote desktop or virtual computing environment 306, which may be provided through a remote desktop/virtual computing environment service 308 over one or more networks 310, which may include aspects of similar named systems described above in reference to FIG. 2. As illustrated, the virtual computing environment service 308 may instantiate one or more virtual machines 312, which may provide an operating system and one or more applications to various user devices, such as user device 304, as a remote desktop/virtual computing environment 306.

In some cases, the virtual machine 312 may provide a video conferencing application, such as represented by windows 314 and 316, displayed on user/client device 304. User device 304 may be equipped with or connected to a camera device 318, which may capture image data 320 of user 302 for presentation in video conferencing application 314, 316. This captured image data 320 may be transmitted over one or more networks 310 to the remote desktop service 308/the specific virtual machine 312 assigned to user device 304. The virtual machine 312 may collect this image data and image data from other user devices 322, 324, 326, 328, and generate a video conferencing application image 330 (e.g., a display window that contains the image data from each of user device 322-328, and image data 320 of user 302), to present to user device 302, 322, 324, 326, 328. The virtual machine 312 may submit the image 330 back to user device 304 (and similarly to user devices 122-128) to be displayed on user device 320 and 322-328 through a virtual computing environment, such as virtual computing environment 306 illustrated for user device 302.

The video conferencing application 314 may provide a preview or display of the image data or video 320 captured of user 302 back to the user 302 via a window 332 within the video conferencing application image 330. In order to reduce delay of the image data 332 displayed back to the user 302 of the user 302, the client device 304 may, upon capturing image data 320, mark pixels around the perimeter of the image data, as represented by bold border 334, to enable later identification of the image data of the user. In some cases, this operation may be an example of user device 304 performing process 236 described above in reference to FIG. 2 In some cases, this marking may include identifying pixels comprising an edge of the image data, that is a given width selected to be distinguishable from other pixels at a later time when the image data 320 is combined with other image data to form video conferencing application image 330. These identified pixels may then have at least one attribute or value changed, such that these modified pixels may be readily distinguishable from other pixels in the image data 320 and/or from pixels expected or likely (e.g., based on historical data) to be present in the application image 330. In some cases, the value or values changed may include any of red, green, or blue values (RGB values) that are used to represent color for a given pixel. In one specific example, these values may be changed to include yellow or another color that is determined to be unlikely to appear in large numbers in the video conferencing application/image data of various users. In other cases, a transparency or alpha value or channel may be changed such that is distinguishable from other pixels in the image data 320/application image 330. In yet other examples, any value in any of various color representation s of pixels may be changed such that the new values are more distinguishable or different from surrounding or expected surrounding pixel values. In other cases, markings 334 may include any indication, such as pixel coordinates, which are not actually part of the image data 320, but are sent or transmitted to the service 308/VM 312 with the image data 320.

The user device may then transit the image data 320/ marking or indication 334 to the service 308/VM 312. The VM 312 may then collect other image data from other users/user devices, and compile them into an application image 330. The VM 312/application 314 may retain the markings 334 indicating the user image data 320 to produce the application image 330, which it may send back to user device 304 for rendering as an application window 314. In cases where the indication is not actually included in the image data itself, but is included as a message or other indication of the pixels or area that is occupied by image data 320, the VM 312/application 314 may send that indication along with the application image 330.

Upon receiving the application image 330, the user device 304, such as through a rendering process/replacement process, such as processes 234, 236 described above in reference to FIG. 2., may identify the user image data via marking or indication 334, and replace the pixels contained within that are with newly captured image data 336 from camera device 318. In some aspects, identifying the pixels or portion of the application image to replace with more recently obtained image data may be performed using one or more neural networks, and/or process 400 described below in reference to FIG. 4.

In some aspects, computer instructions for performing one or more of process 236 and/or 212 may be contained within a virtual computing environment or remote desktop display standard protocols, such as DCV, WSP, PCoIP, RDP, and/or VNC. In these examples, the protocol may include boundaries or direct instruction on what actions each of the user device 228 and the VM/application 218 need to perform to implement the described techniques.

Figure 3B:
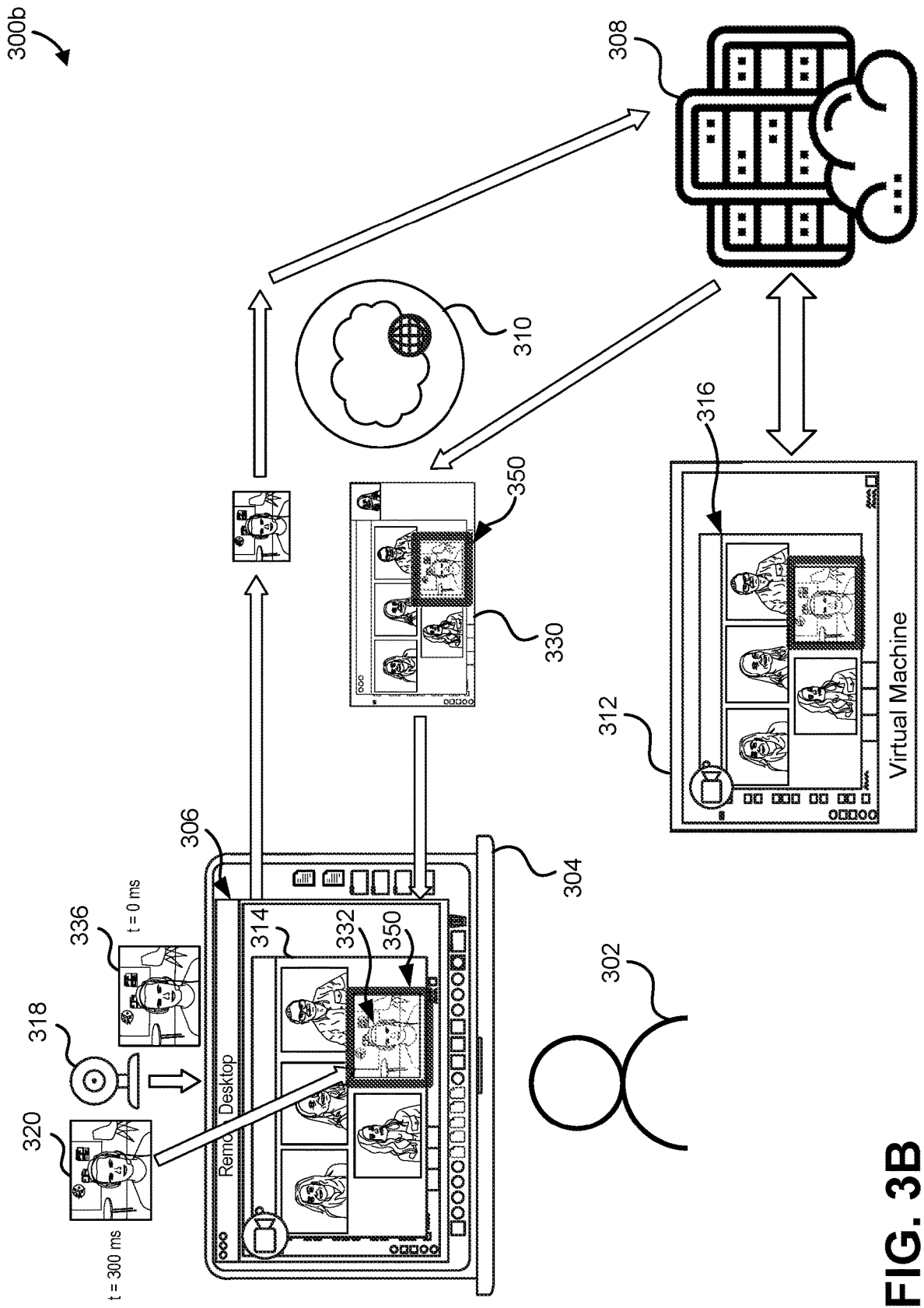

FIG. 3B illustrates another example diagram 300*b* of a local video replacement operation through a remote desktop. Diagram 300*b* may include many of the same elements or aspects as diagram 300*a* described above in reference to FIG. 3A, but with some modifications; for the sake of brevity, similar aspects will not be described again here.

In diagram 300*b*, the identification of the pixels or portion(s) of image data 320 captured by camera device 318 of user device 304 to be replaced may be performed by VM 312/remote desktop service 308. This may be an example of process 212 described above in reference to FIG. 2. In this example, the by VM 312/remote desktop service 308 may identify pixels contained within image data 320 from user device 304 and mark then or otherwise change them in some way, as indicated via border 350, to distinguish the pixels of image data 320 from other pixels from a display generated of application 314 in application image 330. In other aspects, the by VM 312/remote desktop service 308 may append or include some other indication of the pixels that comprise user image data 320, and send that indication to user device 304 along with application image 330. In some cases, the indication may include some identification of the perimeter or border or boundary of image data 320 within application image 330, such as by indicating one or a plurality of pixel locations that uniquely define the perimeter of the image data 320, such that may form any of a variety of shapes, such as a square, circle, oval, rectangle, triangle, etc. In some cases, the indication may be included in the image data itself, such as of the application image 330, or may be separate from the image data, such as contained in one or more messages, etc.

Upon receiving the application image 330 and indication 350, the user device 304, such as through a rendering process/replacement process, such as processes 234, 236 described above in reference to FIG. 2., may identify the user image data via marking or indication 350, and replace the pixels contained within that are with newly captured (or more recently captured) image data 336 from camera device 318. In some aspects, identifying the pixels or portion of the application image to replace with more recently obtained image data may be performed using one or more neural networks, and/or process 400 described below in reference to FIG. 4.

Figure 4:
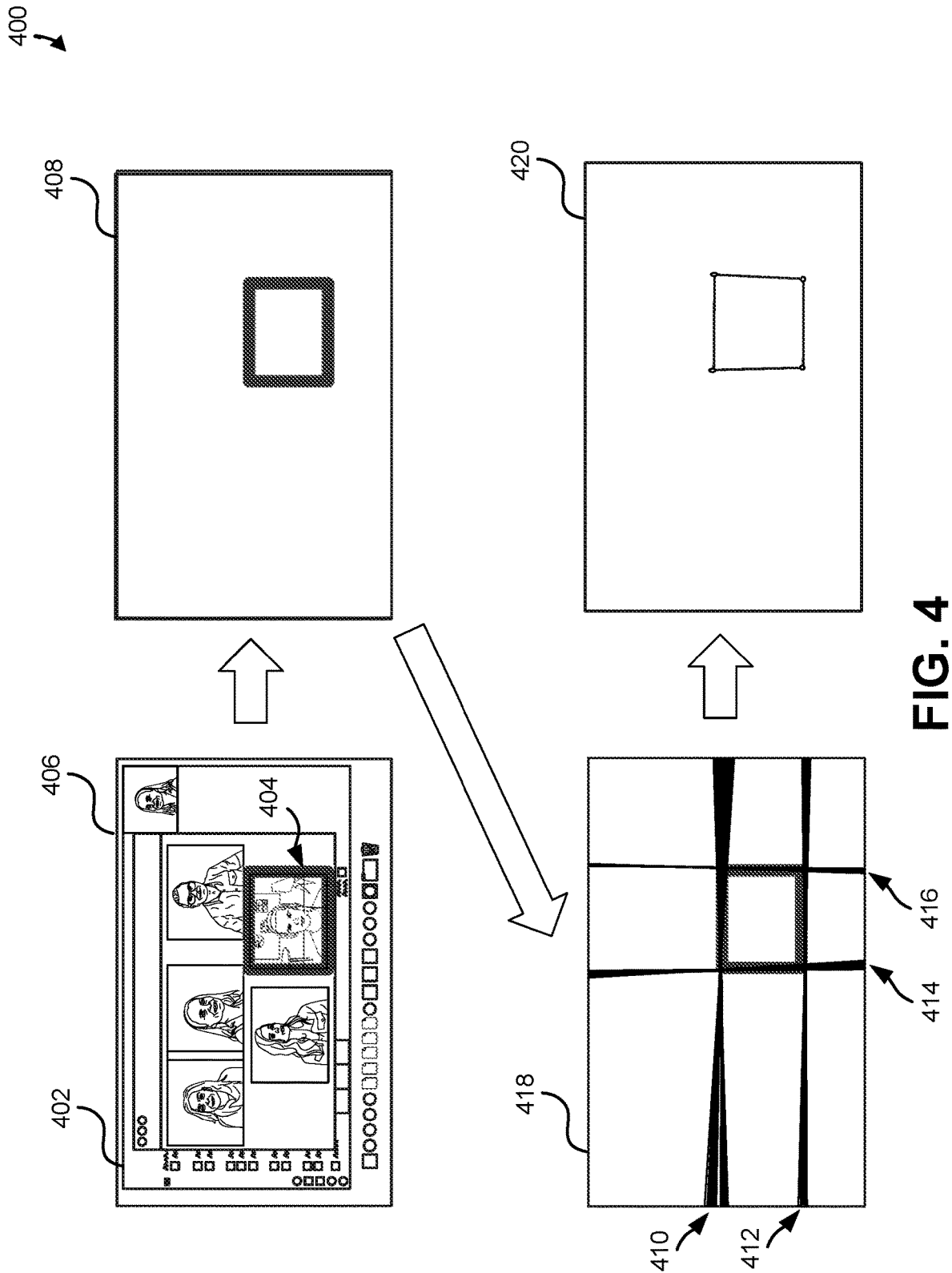
FIG. 4 illustrates an example process for identifying a region of image to perform a replacing, according to at least one embodiment.

FIG. 4 illustrates an example process 400 for identifying a region of image to perform a replacement. In some aspects, process 400 may be performed by user device, such as any of user devices 104, 228, or 304 described above, to determine which pixels or area of a user image data to replace with more recently acquire user image data in an application image.

Process 400 may include identifying the indication or markings 404 within an image data, such as application image 402, that may indicate which pixels to replace with other image data. As illustrated, the markings are illustrated in box 406, and the result of this identification process is illustrated in box 408. A Hough transform may then be applied to the image data to detect sides or lines of the perimeter within the application image, as illustrated via intersecting lines 410, 412, 414, 416 in box 418. Once the lines are detected, the intersections of the identified lines may be computed, as illustrated in box 420, to uniquely identify an area (e.g., defined in pixel coordinates) to be replaced, such as by the techniques described in more detail above.

It should be appreciated that process 400 is only given by way of example. Various other techniques for detecting a portion of image data may be utilized to a similar effect. In some cases, historical data may be utilized to determine a location and/or dimensions or location of image data to be replaced within a larger area of image data. In this example, a video based application may always or regularly place a preview image (e.g., of a user) in a similar or same location. In this case, this data may be used either in addition to, or in place of, the markings or indication, to identify the portion of image data to replace with more recently obtained image data. In some cases, one or more verification steps may also be performed, such as to validate a piece of information or marking within the image data of the user. In some aspects, areas of the application image may be predefined to contain image data for specific users. In this scenario, a marking or other modification may be placed in the appropriate area of the image data, such that the specific marking can be searched for by the user device, to then identify a preset area that is to be replaced.

In yet other cases, one or more neural networks may be utilized to detect one or more characteristics of the user to identify the correct portion of the application image. In these examples, facial features or other unique or rarely duplicated features or artifacts in the image data may be identified by a neural network, such as based on training and/or comparison to the image that is to be used to replace the delayed image data. In these examples, the marking or indication may not b necessary, but may be incorporated, in some aspects, to increase accuracy, etc.

Figure 5:
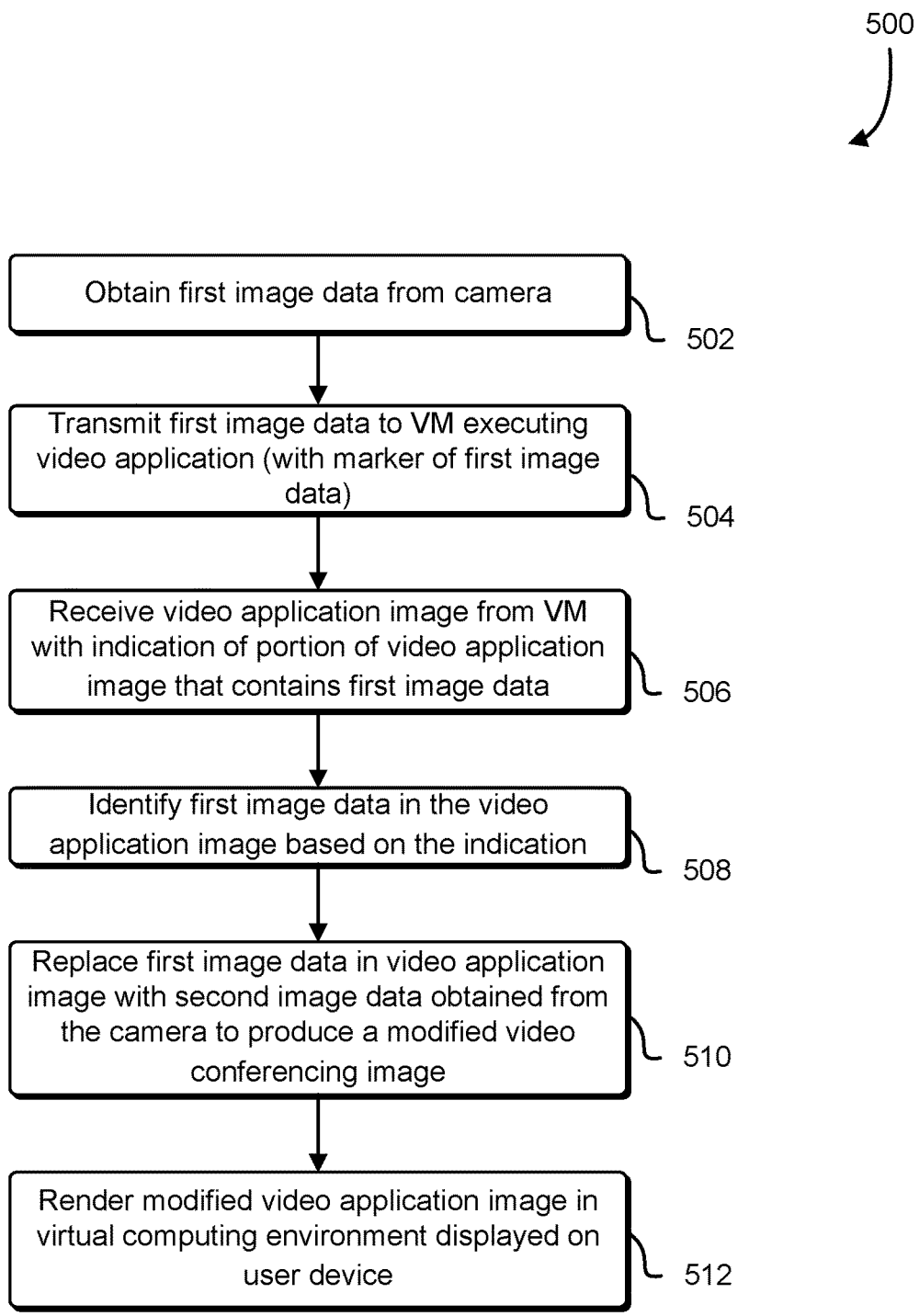
FIG. 5 illustrates an example process for replacing a portion of streaming image data with locally captured image data in a remote desktop, decomposing a schedule into smaller time windows, according to at least one embodiment.

FIG. 5 illustrates an example process for replacing a portion of streaming image data with locally captured image data in a remote desktop. In some cases, process 500 may be performed at least in part by a user device 104, 228, or 304 and/or an image rendering process 234 and/or client image data replacement process 236 described above. In some aspects, one or more of VM image data replacement process 212 may also perform some of operation of process 500, such as including part of operation 506.

Process 500 may begin at operations 502, in which first image data may be received or obtained from a local camera device connected to the user device. The image data may take a variety of forms, as is known in the art. At operation 504, the first image data may be sent or transmitted to a virtual machine that executes a video application, such as a video conferencing application. In some cases, the first image data may also be communicated with an indication or marking of a boundary or perimeter of the first image data, as described in more detail above. This may include transmitting an identifier of a perimeter of the first image data to the virtual machine along with the first image data, where the indication of the portion of the video application image that contains the first image data is based on the identifier of the perimeter of the first image data. In some examples, the indication may include changing the pixels that define the permitter of the video data to comprise a color that uniquely identifies the permitter of the video data in the modified video conferencing application image, or changing a transparency value of the pixels that define the permitter of the video data to distinguish the pixels that define the permitter of the video data from other pixels of the modified video conferencing application image. In some aspects, the indication/identifier of the perimeter may be included in the image data itself, or may be separate from the image data. In some aspects, a user device may perform the marking.

At operation 506, the user device may receive a video application image from the virtual machine, where the video application image includes an indication of a portion of the video application image that contains the first image data. In some cases, the indication may be originally generated by the user device itself, and in other aspects, it may be generated by the VM. Next, at operation 508, the first image data may be identified in the video application image based on the indication. In some cases, operation 508 may utilize process 400 described above, or any of the various alternative processes also described in reference to FIG. 4 above.

At operations 510, the first image data in the video application image may be replaced with second image data obtained from the local camera device to produce a modified video conferencing image, where the second image data is obtained from the local camera device. At operation 512, the modified video application image may be rendered in a virtual computing environment displayed on the user device, where the virtual computing environment is provided by the virtual machine and is distinct from a computing environment of the user device.

In some aspects, process 500 may also include detecting movement of the modified video application image in the virtual computing environment displayed on the user device, and responsive to the detecting, rendering the first image data instead of the second image data in the video application image in the virtual computing environment displayed on the user device. In yet some aspects, process 500 may also include detecting obstruction of the modified video application image in the virtual computing environment displayed on the user device, and responsive to the detecting, rendering the first image data instead of the second image data in the video application image in the virtual computing environment displayed on the user device.

In some cases, one or more of operations 504 (marking the image data), 508, 510, and/or 512 may be performed using one or more graphic processing units (GPU), such as of or associated with a user device. A GPU may decrease time needed to perform these operations, such as by executing various processes in parallel. This may particularly be the case where a large number of pixels are being scanned to identify different characteristics (e.g., operation 508), or in changing a number of pixels, such as in operation 504. As is known in the art, one or more GPUs may also be particularly suited to performed operations 510 and 512, in modifying image data and rending image data. In some aspects, decreasing the time to perform one or more of operations 508, 510, 512 may enable the described techniques to be implemented with minimal or no delay experienced by the user.

Figure 6:
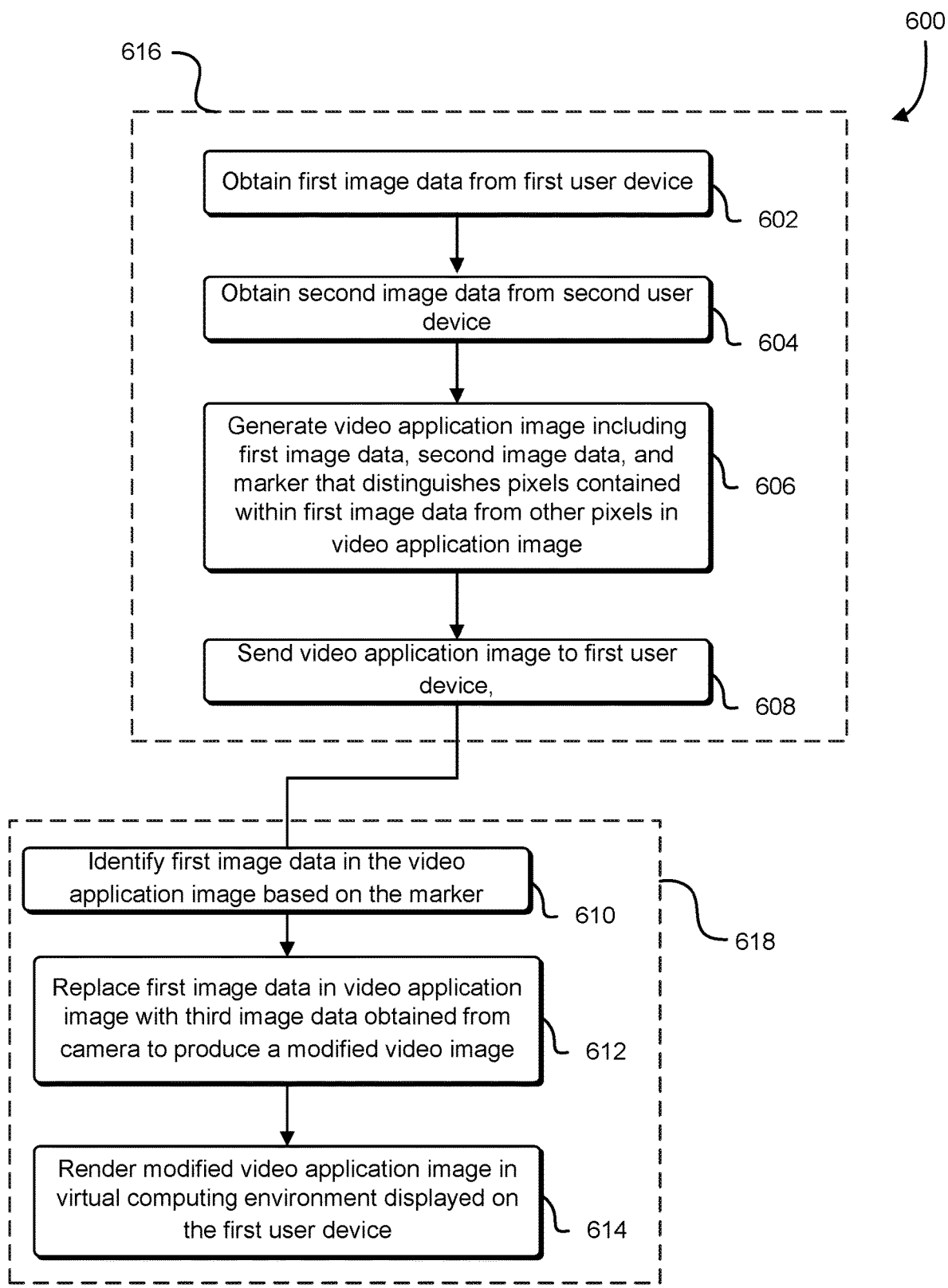
FIG. 6 illustrates another example process for replacing a portion of streaming image data with locally captured image data in a remote desktop, decomposing a schedule into smaller time windows, according to at least one embodiment.

FIG. 6 illustrates another example process for replacing a portion of streaming image data with locally captured image data in a remote desktop. In some cases, process 600 may be performed at least in part by a user device 618, which may incorporate one or more aspects of user device 104, 228, or 304 and/or an image rendering process 234 and/or client image data replacement process 236 described above. In some cases, process 600 may be performed at least in part by a VM 616, which may include one or more aspects of VM 216, application 218, and/or VM image replacement process 212.

Process 600 may begin at operations 602, in which first image data may be obtained from a first user device, where the first image data is captured by a camera device connected to the user device. At operation 604, second image data may be obtained from a second user device. At operation 606, the VM 616 may generate a video application image including the first image data, the second image data, and a marker which distinguishes pixels contained within the first image data from other pixels contained within the video application image. In some aspects, the video application may include a video conferencing application. In some examples, the marker may include a modification to at least one value of individual pixels of the pixels contained within the first image data, such that define a perimeter of the first image data, or an indication of pixels that define a perimeter of the first image data.

Next, at operation 608, the VM 616 may send the video application image to the first user device 618, which may cause the first user device 618 to preform one or more of the following operations 610, 612, 614. At operations 610, the first user device 618 may identify the first image data in the video conferencing application image based on the marker. At operation 612, the first user device 618 may replace the first image data in the video application image with third image data obtained from the camera device to produce a modified video conferencing image. At operation 614, the first user device 618 may render the modified video conferencing image in a virtual computing environment displayed on the first user device, where the virtual computing environment is provided by the virtual machine and is distinct from a computing environment of the first user device.

In some aspects, process 600 may also include detect a triggering event, and responsive to detecting the triggering event, suspend replacing the first image data in the video conferencing application image with second image data obtained from the camera device to produce the modified video conferencing image. In some cases, the triggering event may be one or more of detecting movement of the video application image within the virtual computing environment of the user device, an obstruction overlapping or covering at least partially the video application image within the virtual computing environment of the user device, or various other events, such as reduced computing resources/reduced available computing resources of the user device, various condition relating to or indicating an increased prioritization of reducing consumption of battery power of the user device, and so on. In some aspects, process 700 may also include resuming replacing the first image data in the video conferencing application image with second image data obtained from the camera device to produce the modified video conferencing image upon detecting a second triggering event, where the second trigger event may be the reverse event of the first triggering events above.

Figure 7:
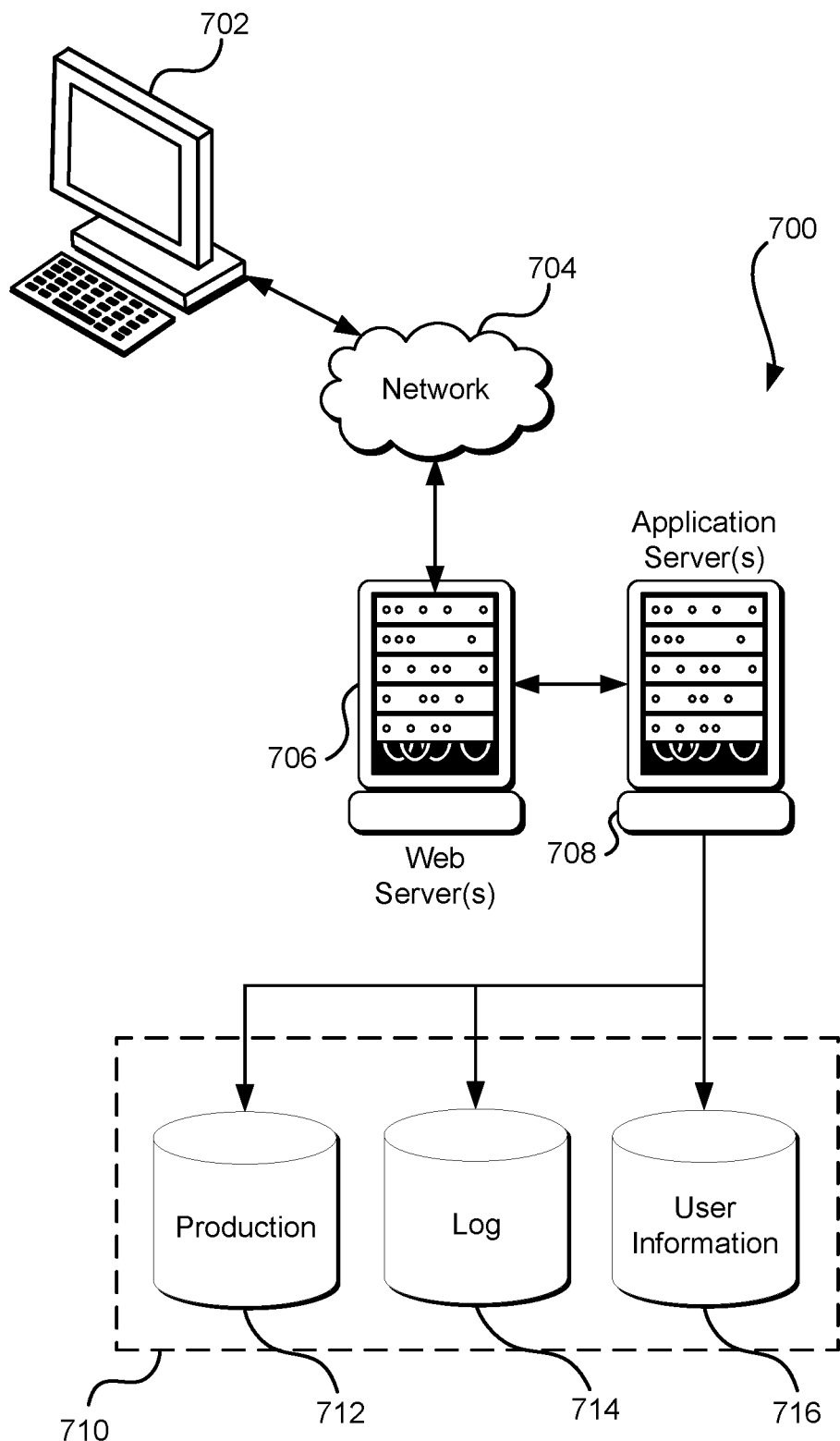
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining video data from a local camera device connected to a user device, the video data comprising a view of a user of the user device associated with a video conferencing application executed on a virtual machine and provided to the user device via a virtual computing environment;
   modifying the video data to generate modified video data by modifying pixels that define a permitter of the video data such that the modified pixels uniquely identify pixels contained in the video data;
   transmitting the modified video data to the virtual machine to cause the virtual machine to inject the modified video data into the video conferencing application to generate a video conferencing application image;
   receiving, by the user device, the video conferencing application image;
   identifying the modified video data in the video conferencing application image based on detecting the modifying pixels that define the permitter of the video data;
   replacing the modified video data in the video conferencing application image with second video data obtained from the local camera device to produce a modified video conferencing application image, wherein the second video data is obtained from the local camera device after the first video data was obtained from the local camera device such that the second video data is associated with less delay than the first video data; and
   rendering the modified video conferencing image in the virtual computing environment displayed on the user device, wherein the virtual computing environment is provided by the virtual machine and is distinct from a computing environment of the user device.

2. The computer-implemented method of claim 1, wherein modifying the video data to generate the modified video data further comprises:
   changing the pixels that define the permitter of the video data to comprise a color that uniquely identifies the permitter of the video data in the modified video conferencing application image.

3. The computer-implemented method of claim 1, wherein modifying the video data to generate the modified video data further comprises:
   changing a transparency value of the pixels that define the permitter of the video data to distinguish the pixels that define the permitter of the video data from other pixels of the modified video conferencing application image.

4. The computer-implemented method of claim 1, further comprising:
   detecting at least one of movement of the modified video conferencing application image in the virtual computing environment displayed on the user device or obstruction of the modified video conferencing application image in the virtual computing environment displayed on the user device; and
   responsive to the detecting, rendering the first video data in the video conferencing application image in the virtual computing environment displayed on the user device.

5. A user device, comprising:
   one or more processors; and
   memory that stores computer-executable instructions that, if executed, cause the one or more processors to:
      obtain first image data from a local camera device connected to the user device;
      transmit the first image data to a virtual machine that executes a video application;
      receive a video application image from the virtual machine, wherein the video application image comprises an indication of a portion of the video application image that contains the first image data;
      identify the first image data in the video application image based on the indication;
      replace the first image data in the video application image with second image data obtained from the local camera device to produce a modified video conferencing image, wherein the second image data is obtained from the local camera device; and
      render the modified video application image in a virtual computing environment displayed on the user device, wherein the virtual computing environment is provided by the virtual machine and is distinct from a computing environment of the user device.

6. The system of claim 5, wherein the memory stores additional computer executable instructions that, if executed, further cause the one or more processors to:
- transmit an identifier of a perimeter of the first image data to the virtual machine along with the first image data, wherein the indication of the portion of the video application image that contains the first image data is based on the identifier of the perimeter of the first image data.

7. The system of claim 6, wherein identifier of the perimeter of the first image data comprises modifications made to a portion of the first image data.

8. The system of claim 6, wherein the identifier of the perimeter of the first image data comprises identifiers of pixels that define a boundary of the first image data.

9. The system of claim 5, wherein the indication of the portion of the video application image that contains the first image data comprises modifications made to a portion of the first image data.

10. The system of claim 5, wherein the indication of the portion of the video application image that contains the first image data comprises identifiers of pixels that define a boundary of the first image data.

11. The system of claim 5, wherein the memory stores additional computer executable instructions that, if executed, further cause the one or more processors to:
- detect movement of the modified video application image in the virtual computing environment displayed on the user device; and
- responsive to the detecting, render the first image data instead of the second image data in the video application image in the virtual computing environment displayed on the user device.

12. The system of claim 5, wherein the memory stores additional computer executable instructions that, if executed, further cause the one or more processors to:
- detect obstruction of the modified video application image in the virtual computing environment displayed on the user device; and
- responsive to the detecting, render the first image data instead of the second image data in the video application image in the virtual computing environment displayed on the user device.

13. A non-transitory computer-readable storage medium storing thereon executable instructions that, as a result of being executed by one or more processors of a computer system, cause the computer system to at least:
- obtain first image data from a first user device, the first image data captured by a camera device connected to the first user device;
- obtain second image data from a second user device;
- generate a video conferencing application image comprising the first image data, the second image data, and a marker which distinguishes pixels contained within the first image data from other pixels comprising the video conferencing application image;
- send the video conferencing application image to the first user device, wherein sending the video conferencing application image to the first user device causes the first user device to:
  - identify the first image data in the video conferencing application image based on the marker;
  - replace the first image data in the video conferencing application image with third image data obtained from the camera device to produce a modified video conferencing application image; and
  - render the modified video conferencing application image in a virtual computing environment displayed on the first user device, wherein the virtual computing environment is provided by the virtual machine and is distinct from a computing environment of the first user device.

14. The non-transitory computer-readable storage medium of claim 13, wherein the first image data further obtained from the first user device further comprises the marker.

15. The non-transitory computer-readable storage medium of claim 13, wherein the marker comprises:
- a modification to at least one value of individual pixels of the pixels contained within the first image data.

16. The non-transitory computer-readable storage medium of claim 15, wherein the pixels comprise a plurality of pixels that define a perimeter of the first image data.

17. The non-transitory computer-readable storage medium of claim 13, wherein the marker comprises an indication of pixels that define a perimeter of the first image data.

18. The non-transitory computer-readable storage medium of claim 13, wherein the executable instructions that, as a result of being executed by one or more processors of the computer system, further cause the computer system to:
- generate a second video conferencing application image comprising the first image data, the second image data, and a second marker which distinguishes pixels contained within the second image data from other pixels comprising the video conferencing application image;
- send the second video conferencing application image to the second user device, wherein sending the video conferencing application image to the second user device causes the second user device to:
  - identify the second image data in the video conferencing application image based on the second marker;
  - replace the second image data in the video conferencing application image with fourth image data obtained from a second camera device connected to the second user device to produce a second modified video conferencing image; and
  - render the second modified video conferencing image in a second virtual computing environment displayed on the second user device, wherein the second virtual computing environment is provided by the virtual machine and is distinct from a second computing environment of the second user device.

19. The non-transitory computer-readable storage medium of claim 13, wherein the executable instructions that, as a result of being executed by one or more processors of the computer system, further cause the computer system to:
- detect a triggering event; and
- responsive to detecting the triggering event, suspend replacing the first image data in the video conferencing application image with second image data obtained from the camera device to produce the modified video conferencing image.

20. The non-transitory computer-readable storage medium of claim 19, wherein the executable instructions that, as a result of being executed by one or more processors of the computer system, further cause the computer system to:
- resume replacing the first image data in the video conferencing application image with second image data obtained from the camera device to produce the modified video conferencing image upon detecting a second triggering event.

\* \* \* \* \*